Sept. 28, 1943.   B. F. MONEY   2,330,511
METHOD OF AND MEANS FOR FORMING LOCK NUTS
Filed Jan. 13, 1940

Benjamin F. Money.
INVENTOR
BY Victor J. Evans & Co.
ATTORNEYS

Patented Sept. 28, 1943

2,330,511

UNITED STATES PATENT OFFICE 2,330,511

METHOD OF AND MEANS FOR FORMING LOCK NUTS

Benjamin F. Money, Tulsa, Okla., assignor of thirty one-hundredths to Charles R. Terry and thirty one-hundredths to Albert Cohan, both of Tulsa, Okla.

Application January 13, 1940, Serial No. 313,776

3 Claims. (Cl. 10—85)

My invention relates to lock nuts, and has among its objects and advantages the provision of improved means for and method of manufacturing lock nuts of the type disclosed in my co-pending application on Lock nuts, filed of even date herewith, wherein the nut is caused to bind upon the associated bolt for nut locking purposes.

Heretofore, many attempts have been devised to provide a lock nut having some of its threads deformed or offset with respect to the remaining threads for the purpose of establishing a binding connection between the nut and its associated bolt. In some cases, the lock nut has been provided with a shank or neck projecting beyond the outer end face of the nut, with the neck constricted or otherwise deformed to offset some of the threads for binding purposes. Such a construction necessitates a nut of special design, which design must include a neck adapted to be deformed for thread distortion purposes. The neck is usually deformed by constriction adjacent its base, and such constriction requires roller mechanism or other system of dies. In addition to the complexity of the deforming devices for nuts of this type, such nuts embody additional expense because of extra material and special methods of fabrication.

Other methods employ a die having an annular flange of relatively steep angle adapted to penetrate the outer face of the nut for constricting the threaded opening. Constriction of the threaded opening adjacent the outer face of the nut brings the first thread convolution into play. While such constriction establishes a binding connection between the nut and the bolt, the binding connection is not uniformly distributed about the bolt because of the fact that the first thread convolution tapers gradually to a point at one end. Thus the binding action is unbalanced, the nut tends to tilt when tightened and the tapered run of the thread wears rapidly when the nut and bolt assembly is subjected to heavy duty service under a vibratory condition.

Other forms of lock nuts of the binding type have been designed with a conical outer face and the outer face margin of the nut has been constricted through the medium of a die having a conical recess fitting over the conical outer face of the nut. Such a nut construction also embodies an unbalanced binding connection between the nut and the associated bolt.

Accordingly, an object of my invention is to provide novel means for and a method of making a lock nut wherein two groups of threads are employed and displaced one from the other in such a manner that the threads of one group are characterized by a balanced binding connection with the bolt throughout the complete circumference thereof, and in which the binding connection is established within the body of the nut inside the first thread convolution adjacent the outer face of the nut.

A further object is to provide novel means for and a method of making a lock nut of the type described which may be formed from a standard nut, in which the nut is self-contained and of unitary design, and in which an effective binding connection is established between the lock nut and its associated bolt throughout an entire circumference.

A further object is to provide novel means for and method of manufacturing a lock nut of the type described wherein the threaded nut is compressed inwardly of its outer face in such manner as to offset a given thread run with respect to the remaining threads of the nut in such manner as to bring certain roots of adjacent threads into closer proximity for the purpose of establishing an effective binding connection between the offset threads and the associated bolt, and in which the binding connection is such as not to impair the threads of the bolt.

Figure 3:
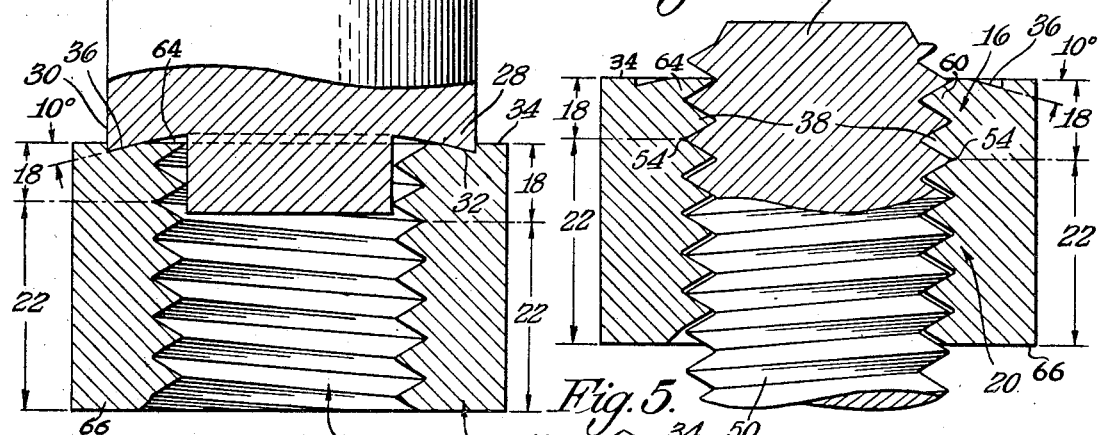
Figure 3 is a sectional view of the nut illustrating the same applied to a conventional bolt, with the latter partly in section for the sake of clearness.

In the embodiment selected to illustrate my invention, I make use of a nut 10 which is conventional with respect to proportion and contour, and also conventional with respect to the threaded opening 12 before distortion of the nut for forming the locking feature. Referring to Fig. 3, the nut 10 is applied to a bolt 14, which bolt is conventional. In Fig. 3, the thread zone 16 of the nut is offset to a depth indicated generally at 18 with respect to the thread zone 20 represented at 22.

In distorting the nut, I make use of a die 24 having one end provided with a centering shaft 26 of such diameter as to fit loosely inside the threaded bore 12 of the nut 10. The die includes a circumferential flange 28 arranged concentrically with respect to the axis of the shaft 26, which flange includes a straight outer wall 30 and a face 32 arranged at an angle of approximately ten degrees to the outer end face 34 of the nut, see Fig. 1. Face 32 is slightly concaved.

Figure 1:
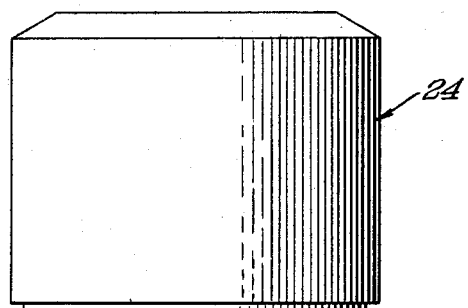
Figure 1 is a sectional view of a nut formed in accordance with my die, with the die illustrated partly in section for the sake of clearness.
Figure 2:
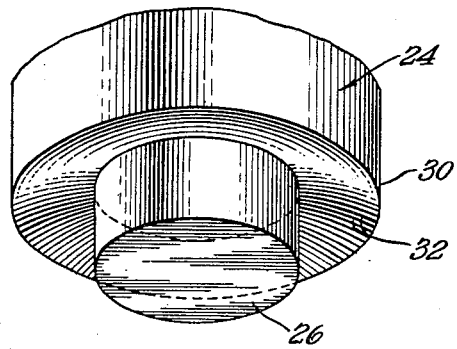
Figure 2 is a perspective view of a portion of the die illustrating the nut deforming face thereof.
Figures 4, 8:
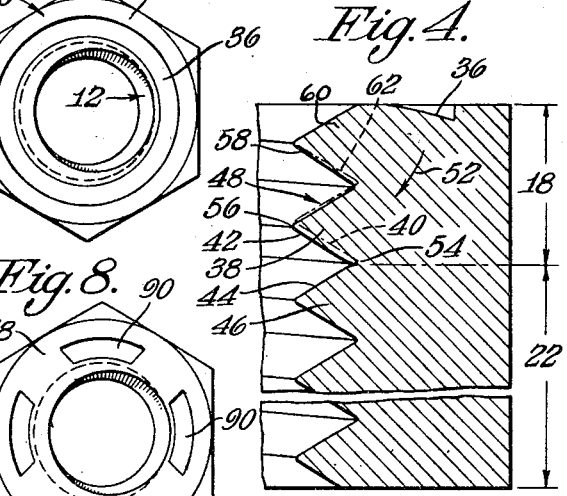
Figure 4 is an enlarged sectional view of a portion of the nut illustrating the manner in which the nut is distorted for binding purposes.
Figure 8 is a plan view of the outer face of a nut formed in accordance with the die of Figure 6.
Figure 7:
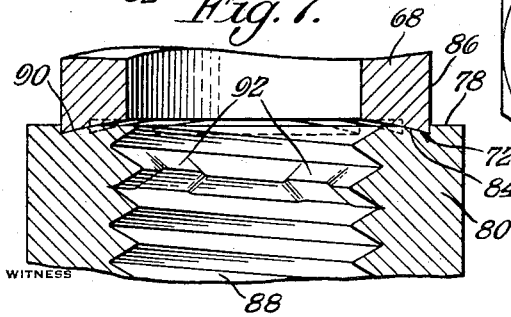
Figure 7 is a view similar to Figure 1 but illustrating the nut distorted by the die of Figure 6.

Distortion of the thread zone 16 is accomplished by placing the die 24 in position and driving the die home to the position of Fig. 1, with the resultant groove 36 formed in the end face 34. Fig. 4 best illustrates the manner in which the thread zone 16 is distorted. Driving of the flange 28 into the nut in the manner of Fig. 1 causes the convolution 38 to be offset from its original dotted line position 40 to the full line position illustrated. Thus the face 42 of the convolution 38 is shifted closer to the face 44 of the convolution 46. Such shifting of the face 42 causes an increased binding connection between the nut threads 48 and the bolt threads 50 within the thread zone 16. The increased binding relation is at its maximum about the second thread convolution beneath the end face 34.

Referring again to Fig. 4, distortion of the thread zone 16 by the die flange 28 causes the material of the nut within the thread zone to be rocked or angled in the direction of the arrow 52 which brings the face 42 into converging relation with respect to its original position 40 from the root area 54 toward the crest 56. At the same time, the inside diameter of the thread zone 16 is slightly constricted, particularly with respect to the second convolution inwardly of the end face 34. Face 58 of the first thread convolution 60 is also shifted slightly in the direction of the arrow 52, as indicated in Fig. 4 when compared with its original position 62. Flange 28 is so fashioned as to compress the nut body in the thread zone 16 to a greater degree about a circumferential line corresponding to the straight wall 30, and the die is so fashioned as to compress the nut body sufficiently far removed from the threaded bore 12 as not to merely constrict the upper or first thread convolution of the nut. The distortion is of such depth as to cause an increased nut locking binding action between the nut and the bolt at a depth corresponding to the second convolution, as illustrated in Fig. 4.

Compression or distortion of the nut body in the manner indicated by arrow 52 causes maximum distortion at the necessary depth within the nut body, to the end that the binding connection between the nut and the bolt is uniformly distributed about the complete circumference of the bolt, and at a depth in which the affected convolution is within the tapering away of the thread convolution adjacent the end face 34. Accordingly, the binding action provides a balanced locking condition between the nut and the bolt, and the thread zone 20 remains intact.

My invention embodies a conventional nut with respect to size and configuration for a given bolt size. The locking action is effective for nut locking purposes, but the distorted thread area is such as not to impair the threads 50 of the bolt. The nut is self-contained and requires no accessories and special tools for locking purposes. The bolt may be applied through the instrumentality of a conventional wrench.

Distortion of the nut body in the thread zone 16 in the direction of the arrow 52 does not offset the tapering run 64 of the nut axially thereof. Rocking of the metal tends to tilt this part of the thread upwardly about its root as an axis, see Fig. 3. Offsetting of the nut axially of the threaded bore 12 inwardly of its outer end face 34 and its inner end face 66 locates the binding zone of the nut intermediate the two nut faces so as not to depend upon a fragmentary thread for nut locking purposes.

Figures 5, 6:
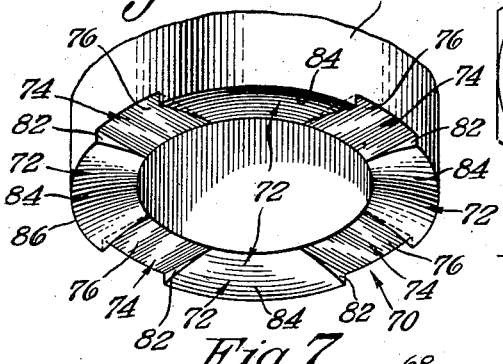
Figure 5 is a plan view of the outer nut face.
Figure 6 is a perspective view of a portion of a different form of die illustrating the nut distorting face thereof.

In Fig. 6, I illustrate a fragment of a die 68 of tubular construction, wherein the end face 70 includes a plurality of nut distorting projections 72 separated one from the other by recesses 74 having bottom faces 76 arranged at right angles to the axis of the die as well as the outer face 78 of the nut 80. Side walls 82 of the recesses 74 are arranged perpendicularly to the bottom faces 76, and the faces 84 of the distorting elements 72 are angled in the same manner as the face 32 of the die 24, with the elements 72 having straight walls 86 corresponding to the straight walls 30 of the die 24. Die 68 is of the same relative diameter as the die 24.

In the operation of the die 68, the die is located concentrically with respect to the threaded bore 88 of the nut 80 and is driven home. The die is driven to such a depth as to bring the bottom faces 76 of the recesses 74 into engagement with the outer face 78 of the nut 80, which provides the nut 80 with a series of recesses 90 which compress the body of the nut in the same manner as the flange 28, but in spaced and localized areas of the same depth as the die 24. However, punching of the recesses 90 distorts the nut body inwardly of its outer face 78 to provide a series of binding regions 92 spaced circumferentially of the threaded bore 88, but at a depth inwardly of the tapering run of the outermost thread convolution of the nut.

Binding regions 92 are localized at a depth corresponding to the second convolution of the nut thread inwardly of its face 78. A nut formed through the medium of the die 68 functions to provide an effective lock nut binding condition circumferentially about the bolt and distributed and located such as to provide a balanced locking condition.

Having thus described certain embodiments of my invention in detail, it is, of course, understood that I do not desire to limit the scope thereof to the exact details set forth except insofar as those details may be defined in the appended claims.

I claim:

1. The method of forming a lock nut from a conventional nut having a threaded bore, which comprises indenting one end face of the nut with a die having a nut engaging contour shaped to apply pressure axially to said face of the nut at a considerable distance from the threaded bore thereof and along a surface of revolution at an acute angle to the nut axis, while at the same time resisting inward radial flow of the nut material from the region exterior to the pressure area, to shift at least one complete thread convolution intermediate the two end faces of the nut axially of the nut and simultaneously rock said thread convolution about its root as an axis to advance the crown of that convolution in the direction of said first-mentioned face.

2. The method of forming a lock nut from a conventional nut having a threaded bore, which comprises indenting one end face of the nut with a die having a nut engaging contour shaped to apply pressure axially to said face of the nut at a considerable distance from the threaded bore thereof and along a surface of revolution at an acute angle to the nut axis, while at the same time resisting inward radial flow of the nut material from the region exterior to the pressure area, to shift at least one thread convolution intermediate the two end faces of the nut axially of the nut and simultaneously rock said convolution and other thread convolutions between said one thread convolution and said first-mentioned face about the root structure of the thread convolutions to shift their crowns in the direction of said one face.

3. A nut deforming die comprising a cylindrical body having a coaxial shaft at one end for reception in the threaded bore of a nut to center the die with respect to the nut, said one end of the die having a slight concavity forming an annular flange having a lateral face lying at an acute angle to the axis of said shaft, said annular flange being concentric with respect to the axis of said shaft and of such diameter as to locate the maximum application of forces at a considerable distance from the threaded bore of the nut to offset at least one complete thread convolution axially of the nut when the die is driven axially of the nut against one end face thereof, with said lateral face rocking the offset thread convolution in a direction to advance the crown thereof in the direction of the die.

BENJAMIN F. MONEY.